United States Patent [19]

Chase et al.

[11] 4,170,694
[45] Oct. 9, 1979

[54] HERMETICALLY SEALED ALKALI METAL BATTERY CONTAINER

[75] Inventors: Gordon G. Chase, San Diego; Richard A. Harlow; Viney K. Gupta, both of Newport Beach, all of Calif.

[73] Assignee: Ford Aerospace & Communications Corp., Dearborn, Mich.

[21] Appl. No.: 965,959

[22] Filed: Dec. 4, 1978

[51] Int. Cl.² ............................................. H01M 2/04
[52] U.S. Cl. .................................. 429/176; 429/104; 429/174
[58] Field of Search .............................. 429/101–104, 429/176, 185, 171, 174; 206/524.1, 524.5; 220/319–321, 216, 67

[56] References Cited

U.S. PATENT DOCUMENTS

| 2,305,901 | 12/1942 | Scharfnagel | 220/67 X |
|---|---|---|---|
| 3,852,114 | 12/1974 | Dubin | 136/83 T |
| 3,852,117 | 12/1974 | Fraioli | 136/133 |
| 3,904,438 | 9/1975 | Naylor | 136/133 |
| 4,049,889 | 9/1977 | Heintz | 429/174 |
| 4,091,190 | 5/1978 | Heintz | 429/104 X |
| 4,104,448 | 8/1978 | Gibson et al. | 429/104 X |
| 4,124,740 | 11/1978 | Dubin | 429/104 |

*Primary Examiner*—Charles F. Lefevour
*Attorney, Agent, or Firm*—William E. Johnson; Keith L. Zerschling

[57] ABSTRACT

This disclosure relates to a hermetically sealed alkali metal battery container. The battery includes a ceramic ring having upper and lower contoured surfaces thereon located on its outer circumferential surface. Outer metal casings defining an upper battery container and a lower battery container are formed so as to have a bell-shaped open end on each one. The bell-shaped open end of respective casings are located adjacent the contoured surfaces formed on the ceramic ring. Each bell-shaped open end of a metal casing has associated therewith a sealing band which engages the open end of the casing to compress the same into engagement with an associated contoured surface of the ceramic ring to form a hermetic seal therebetween.

6 Claims, 3 Drawing Figures

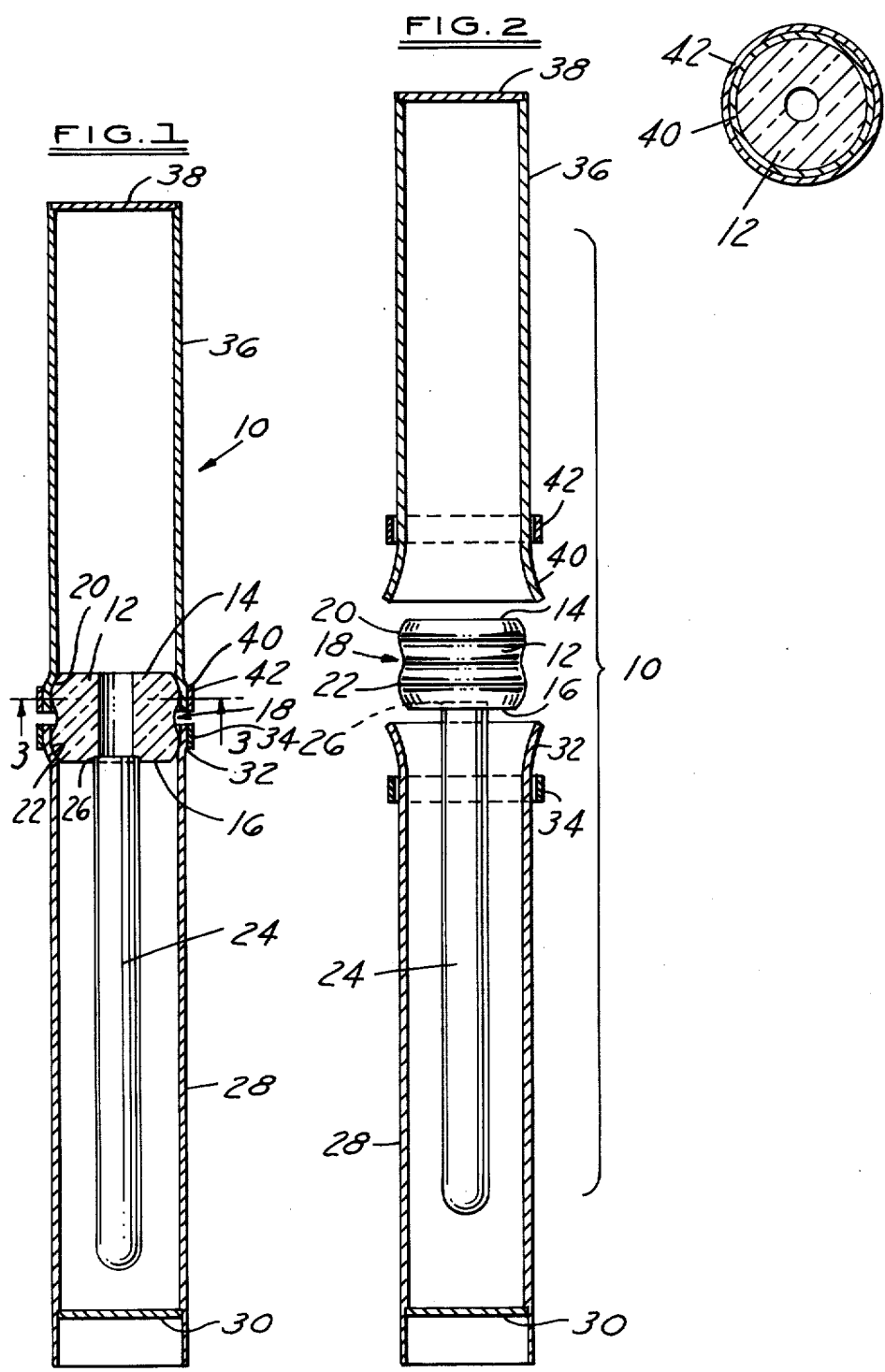

HERMETICALLY SEALED ALKALI METAL BATTERY CONTAINER

BACKGROUND OF THE INVENTION AND PRIOR ART STATEMENT

In a novelty search conducted on the subject matter of this specification, several patents were cited showing structures for sealing containers. Of the patents cited, U.S. Pat. Nos. 3,852,114; 3,852,117; and 3,904,438 were directed to structures for sealing electrochemical cells. None of these patents, or the others cited in the search report, which others were further afield than the patents specifically cited above, disclosed an electrochemical cell in which a bell-shaped open end casing was hermetically sealed against a contoured surface of a ceramic ring by means of a sealing band which engaged the bell-shaped open end of the casing to compress the same into engagement with the contoured surface of the ceramic ring.

We know of no other art in this area which is relevant to the particular hermetic seal which we have developed. We believe that our development is a unique seal which has not been known in the art before.

U.S. Pat. No. 4,049,889 shows a structure which we consider to be a typical sealing arrangement for an alkali battery container. Such a sealing arrangement employs fastening devices, such as bolts, which are received in flange devices capable of applying pressure in the proper direction to various components of an alkali metal battery in order to seal the same. Many other sealing arrangements employing fastening devices are known in the art.

It is a principal object of this invention to provide a hermetically sealed alkali metal battery container in which the seal is made with very simple structure which does not employ any fastening devices. It is an additional object of this invention to provide a hermetically sealed alkali metal battery container in which the sealing components are of relatively simple design, but the seal provided thereby is of very high quality.

SUMMARY OF THE INVENTION

This invention is directed to a structure for containing an alkali metal battery and, more particularly, to a structure for containing such a battery which provides an efficient and simple means of sealing one battery container from another battery container.

In accordance with the general principles of this invention, a hermetically sealed alkali metal battery container includes the following structure. A ceramic ring is provided which has top and bottom surfaces. The ceramic ring also has an outer circumferential surface which is formed so as to have an upper and a lower contoured surface respectively adjacent the top and the bottom surfaces of the ceramic ring. An inner casing formed of a solid alkali ion-conductive material and having a closed end is attached near its open end to an interior surface of the ceramic ring so that the inner casing extends downwardly from the bottom surface of the ceramic ring.

A first metal outer casing with a closed end and a bell-shaped open end having a diameter slightly greater than the diameter of the lower contoured surface of the ceramic ring is also located so that its bell-shaped open end encircles the lower contoured surface of the ceramic ring. A first sealing band engages the bell-shaped open end of the first metal outer casing to compress the same into engagement with the lower contoured surface of the ceramic ring. The engagement of the sealing band with the bell-shaped open end of the metal outer casing provide a hermetic seal between the casing and the lower contoured surface of the ceramic ring.

In a similar manner, a second metal outer casing with a closed end and a bell-shaped open end encircles the upper contoured surface of the ceramic ring. A second sealing band engages the bell-shaped open end of the second metal outer casing to compress the same into sealing engagement with the upper contoured surface of the ceramic ring to provide the hermetic seal therebetween.

While, in the preferred embodiment of this invention, it is desired that seals on both containers of an alkali metal battery be made in the same manner, the hermetic seal of this invention may be applied to seal one container of the alkali metal battery while a different type of seal is used to seal the second container.

In accordance with further detailed aspects of the structure of this invention, the contoured surfaces formed on the ceramic ring are semi-circular in cross section. Also in accordance with preferred teachings, the contoured surfaces extend to the same diameter on the ceramic ring.

In accordance with still additional preferred teachings of the structure of this invention, the sealing bands are formed of metal and are drawn down over the bell-shaped open ends to deform the same into sealing contact with respective ones of the contoured surfaces.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in conjunction with the accompanying drawings, wherein like reference characters indicate like parts throughout the several figures, and in which:

FIG. 1 is an elevational view, partly in cross section showing a hermetically sealed alkali metal battery container formed in accordance with the teachings of this invention in a fully assembled condition; wherein FIG. 2 is a view similar to FIG. 1 showing the container in a disassembled condition, and FIG. 3 is a cross sectional view taken along line III—III of FIG. 1 to show in detail the manner in which the hermetic seal is obtained.

DESCRIPTION OF THE PREFERRED EMBODIMENT

An alkali metal battery to which this invention pertains is well known in the art. Many patents have issued on various aspects of alkali metal battery construction. This particular specification is directed to a structure for providing a hermetic seal for a reactant container for such a battery.

In FIGS. 1 and 2, there is seen an alkali metal battery generally designated by the numeral 10. This battery includes a ceramic ring 12 which has a top surface 14 and a bottom surface 16. The ceramic ring also has an outer circumferential surface, generally designated by the numeral 18. This surface 18 is formed so as to have an upper contoured surface 20 and a lower contoured surface 22. In accordance with the teachings of the preferred embodiment of this invention, the upper contoured surface 20 and the lower contoured surface 22 are generally semi-circular in cross section, and the ceramic ring is formed from a material such as alpha alumina of high purity, such as 99.8%.

An inner casing 24 of a solid alkali ion conductive material is in the form of a closed end tube. This casing is used as a reaction zone separator and is made from a material which will permit the transfer of ions of anodic reactant therethrough to a cathodic reactant. The construction of such a structure is well known in the art, and one material which is useful is a beta-type alumina or sodium beta-type alumina. This inner casing is bonded near its open end within and to an interior surface 26 of the ceramic ring 12 by means of a glass seal, not shown, so that the inner casing extends downwardly from the bottom surface 16 of the ceramic ring.

A first outer metal casing 28 with a closed end 30 and a bell-shaped open end 32, best seen in FIG. 2, is also provided. This casing surrounds the inner casing 24 and is spaced therefrom. This casing is made from a metal such as 446 stainless steel.

The bell-shaped open end 32 of the first outer casing 28 has a diameter slightly greater than the diameter of the lower contoured surface 22 of the ceramic ring. The bell-shaped open end 32 is brought into a position encircling the lower contoured surface of the ceramic ring and, as is best seen in FIG. 1, is hermetically sealed thereto by means of a first sealing band 34. This first sealing band is preferably made of a metal such as steel. The sealing band is pulled up over the bell-shaped open end 32 of the first outer casing 28 in order to deform the same inwardly into physical contact with the lower contoured surface 22 of the ceramic ring 12. This action brings a bonding of these elements into a structure which hermetically seals the first outer casing 28 to the ceramic ring 12.

In a like manner, a second outer casing 36 is provided which has a closed end 38 and a bell-shaped open end 40. The bell-shaped open end 40 of the second outer casing 36 is brought into an encircling relationship with respect to the upper contoured surface 20 of the ceramic ring 12. A second sealing ring 42 is pulled downwardly over the bell-shaped open end 42 to deform the same inwardly into sealing contact with the upper contoured surface 20 of the ceramic ring thereby to provide a hermetic seal therebetween.

In the preferred embodiment, the diameters of both the upper contoured surface 20 and the lower contoured surface 22 of the ceramic ring were the same. This does not necessarily have to be the case, and the diameters of these two different areas may be different. Also, the shape and configuration of the contoured surface may vary in order to give a sealed construction. Also, the sealing arrangement may be used on just the upper or the lower of the two containers, and a different sealing arrangement may be used for sealing the second of the two containers.

As will be noted, the seals obtained using the structure of this disclosure are extremely simple in construction and are relatively easy to accomplish. As an additional matter, the sealing structure eliminates the necessity of providing fastening devices and this, in turn, eliminates wide fastening flanges which increase the outside diameter of the overall unit. By using the construction of this invention, a plurality of battery units may be confined within a smaller total volume than is needed when structures using outside flanges and fastening devices are employed.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. A hermetically sealed alkali metal battery container comprising:
   a ceramic ring having top and bottom surfaces, said ceramic ring having an outer circumferential surface which is formed so as to have an upper and a lower contoured surface respectively adjacent said top and said bottom surfaces thereof;
   an inner casing of a solid alkali ion-conductive material with an open end and a closed end;
   sealing means for bonding said inner casing adjacent its open end to said ceramic ring so that said inner casing extends from said bottom surface of said ceramic ring;
   a first metal outer casing with a closed end and a bell-shaped open end having a diameter slightly greater than the diameter of said lower contoured surface of said ceramic ring, said bell-shaped open end encircling said lower contoured surface;
   a first sealing band engaging said bell-shaped open end of said first metal outer casing to compress the same into engagement with said lower contoured surface of said ceramic ring to form a hermetic seal therebetween; and
   a second metal outer casing with a closed end and a bell-shaped open end having a diameter slightly greater than the diameter of said upper contoured surface of said ceramic ring, said bell-shaped open end encircling said upper contoured surface; and
   a second sealing band engaging said bell-shaped open end of said second metal outer casing to compress the same into engagement with said upper contoured surface of said ceramic ring to form a hermetic seal therebetween.

2. The alkali metal battery container of claim 1, wherein:
   said contoured surfaces are semi-circular in cross section.

3. The alkali metal battery container of claim 1, wherein:
   said contoured surfaces extend to the same diameter.

4. The alkali metal battery container of claims 2 or 3, wherein:
   said sealing bands are metal and are drawn down over said bell-shaped open ends of said casing to deform the same into sealing contact with respective ones of said contoured surfaces.

5. A hermetic sealed subassembly for an alkali metal battery which comprises:
   a ceramic ring having top and bottom surfaces and an outer circumferential surface which is formed to have at least one contoured surface thereon;
   a metal outer casing having a bell-shaped open end which has a diameter slightly greater than the diameter of said contoured surface of said ceramic ring, said bell-shaped open end of said metal outer casing encircling said contoured surface of said ceramic ring; and a sealing band engaging said bell-shaped open end of said metal outer casing to compress the same into engagement with said contoured surface of said ceramic ring to form a hermetic seal therebetween.

6. The hermetic sealed subassembly of claim 5, wherein:
said sealing band is a metal band which is drawn down over said bell-shaped open end of said metal outer casing to deform the same into sealing contact with said contoured surface of said ceramic ring.

* * * * *